(12) United States Patent
Miyazawa

(10) Patent No.: US 11,764,704 B2
(45) Date of Patent: Sep. 19, 2023

(54) PIEZOELECTRIC RESONATOR AND DRIVE DEVICE

(71) Applicant: SEIKO EPSON CORPORATION, Tokyo (JP)

(72) Inventor: Takao Miyazawa, Shimosuwa-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/748,062

(22) Filed: May 19, 2022

(65) Prior Publication Data

US 2022/0376635 A1 Nov. 24, 2022

(30) Foreign Application Priority Data

May 21, 2021 (JP) ................................. 2021-085921

(51) Int. Cl.
*H02N 2/10* (2006.01)
*H02N 2/14* (2006.01)
*H02N 2/00* (2006.01)

(52) U.S. Cl.
CPC ........... *H02N 2/103* (2013.01); *H02N 2/0085* (2013.01); *H02N 2/147* (2013.01)

(58) Field of Classification Search
CPC ....... H02N 2/103; H02N 2/0085; H02N 2/147
See application file for complete search history.

(56) References Cited

U.S. PATENT DOCUMENTS

| 7,915,788 | B2 * | 3/2011 | Koc ....................... H02N 2/026 |
| | | | 310/365 |
| 11,411,512 | B2 * | 8/2022 | Kajino .............. H01L 21/67706 |
| 2009/0256445 | A1 | 10/2009 | Kotani |

FOREIGN PATENT DOCUMENTS

| JP | 2003501988 A | 1/2003 |
| JP | 2009254198 A | 10/2009 |
| WO | 0074153 A1 | 12/2000 |

* cited by examiner

*Primary Examiner* — Emily P Pham
(74) *Attorney, Agent, or Firm* — Gang Yu

(57) ABSTRACT

A piezoelectric resonator includes a vibrating part having a pair of principal surfaces in an obverse-reverse relationship, and a side surface configured to couple the pair of principal surfaces to each other, and a protruding part which is provided to the vibrating part, and is configured to transmit a drive force generated by a vibration of the vibrating part to a driven part, wherein the vibrating part has a pair of vibrating plates including a first vibrating plate and a second vibrating plate stacked on one another in a first direction in which the pair of principal surfaces are arranged side by side, the first vibrating plate has a flexural vibrating piezoelectric element configured to flexurally vibrate the vibrating part in a third direction perpendicular to a second direction in which the driven part and the protruding part are arranged side by side in a plan view of the principal surfaces, either one or both of the first vibrating plate and the second vibrating plate have a stretching vibrating piezoelectric element configured to make the vibrating part perform a stretching vibration in the second direction, and the side surface is provided with a plurality of terminals electrically coupled to the flexural vibrating piezoelectric element and the stretching vibrating piezoelectric element.

8 Claims, 15 Drawing Sheets

PIEZOELECTRIC RESONATOR AND DRIVE DEVICE

The present application is based on, and claims priority from JP Application Serial Number 2021-085921, filed May 21, 2021, the disclosure of which is hereby incorporated by reference herein in its entirety.

BACKGROUND

1. Technical Field

The present disclosure relates to a piezoelectric resonator and a drive device.

2. Related Art

In, for example, JP-T-2003-501988 (Document 1, the term "JP-T" as used herein means a published Japanese translation of a PCT patent application), there is described a piezoelectric resonator having a first piezoelectric substrate which has a lower surface provided with a common electrode and an upper surface provided with an individual electrode, a second piezoelectric substrate which is stacked on the first piezoelectric substrate, and has an upper surface provided with an individual electrode, a third piezoelectric substrate which is stacked on the second piezoelectric substrate, and has an upper surface provided with a common electrode, and a fourth piezoelectric substrate which is stacked on the third piezoelectric substrate, and has an upper surface provided with an individual electrode. By stacking three layers of individual electrodes using the four piezoelectric substrates in such a manner, it is possible to increase an output of the piezoelectric resonator.

However, in the piezoelectric resonator described in Document 1, the individual electrodes are divided into four electrodes, wherein two of the four electrodes form an electrode pair for exciting a flexural vibration toward one side, and two electrodes as the rest of the four electrodes form an electrode pair for exciting a flexural vibration toward the other side. As described above, in the piezoelectric resonator of Document 1, since the individual electrodes include only the electrodes for exciting the flexural vibration, the output cannot sufficiently be enhanced.

SUMMARY

A piezoelectric resonator according to the present disclosure includes a vibrating part having a pair of principal surfaces in an obverse-reverse relationship, and a side surface configured to couple the pair of principal surfaces to each other, and a protruding part which is provided to the vibrating part, and is configured to transmit a drive force generated by a vibration of the vibrating part to a driven part, wherein the vibrating part has a pair of vibrating plates including a first vibrating plate and a second vibrating plate stacked on one another in a first direction in which the pair of principal surfaces are arranged side by side, the first vibrating plate has a flexural vibrating piezoelectric element configured to flexurally vibrate the vibrating part in a third direction perpendicular to a second direction in which the driven part and the protruding part are arranged side by side in a plan view of the principal surfaces, either one or both of the first vibrating plate and the second vibrating plate have a stretching vibrating piezoelectric element configured to make the vibrating part perform a stretching vibration in the second direction, and the side surface is provided with a plurality of terminals electrically coupled to the flexural vibrating piezoelectric element and the stretching vibrating piezoelectric element.

A drive device according to the present disclosure includes a driven part, and a piezoelectric resonator configured to drive the driven part, wherein the piezoelectric resonator includes a vibrating part having a pair of principal surfaces in an obverse-reverse relationship, and a side surface configured to couple the pair of principal surfaces to each other, and a protruding part which is provided to the vibrating part, and is configured to transmit a drive force generated by a vibration of the vibrating part to a driven part, the vibrating part has a pair of vibrating plates including a first vibrating plate and a second vibrating plate stacked on one another in a first direction in which the pair of principal surfaces are arranged side by side, the first vibrating plate has a flexural vibrating piezoelectric element configured to flexurally vibrate the vibrating part in a third direction perpendicular to a second direction in which the driven part and the protruding part are arranged side by side in a plan view of the principal surfaces, either one or both of the first vibrating plate and the second vibrating plate have a stretching vibrating piezoelectric element configured to make the vibrating part perform a stretching vibration in the second direction, and the side surface is provided with a plurality of terminals electrically coupled to the flexural vibrating piezoelectric element and the stretching vibrating piezoelectric element.

DESCRIPTION OF EXEMPLARY EMBODIMENTS

A piezoelectric resonator and a drive device according to the present disclosure will hereinafter be described in detail based on some preferred embodiments shown in the accompanying drawings.

First Embodiment

Figure 1:
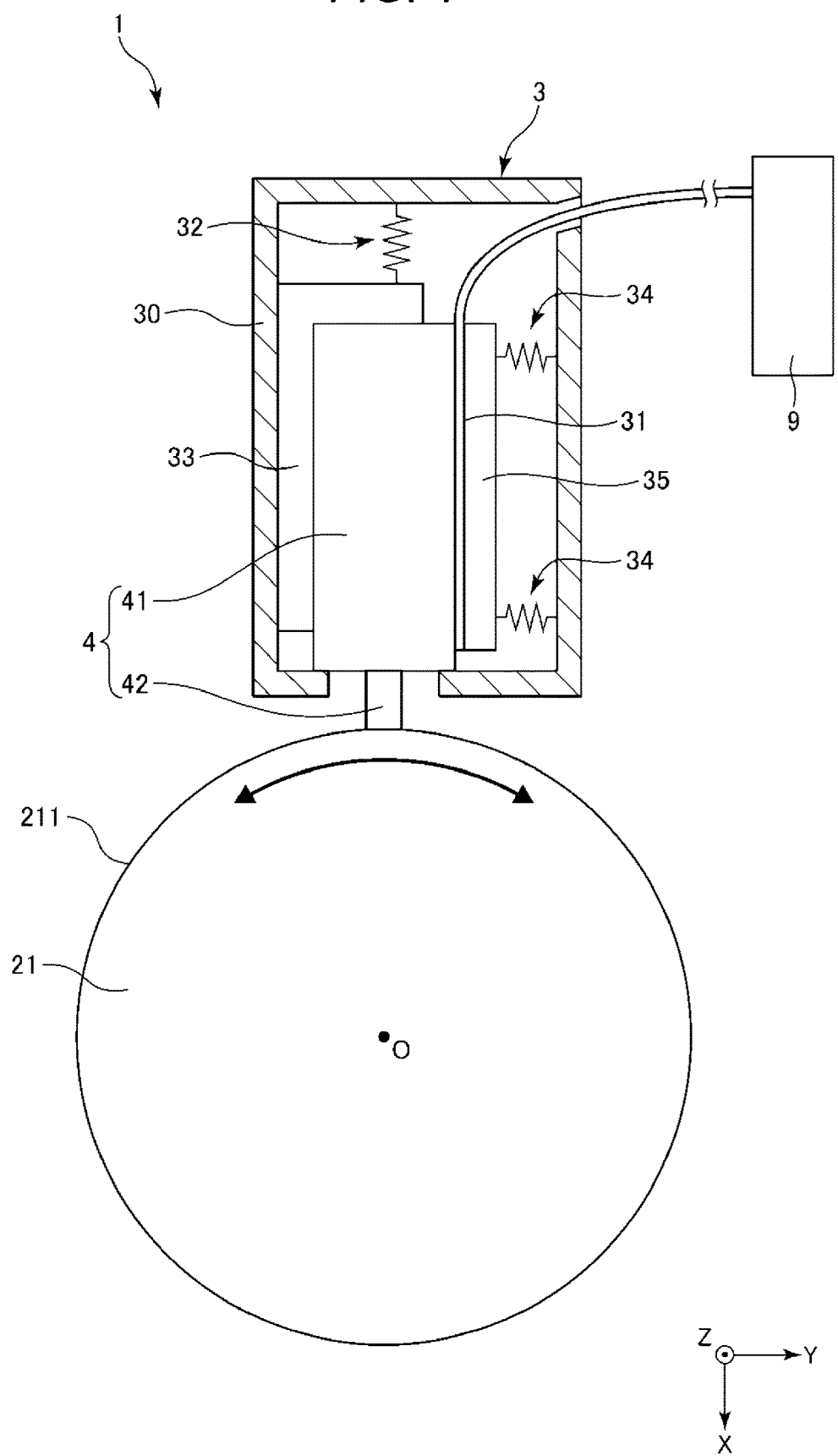
FIG. 1 is an overall view showing a drive device according to a first embodiment.
Figure 2:
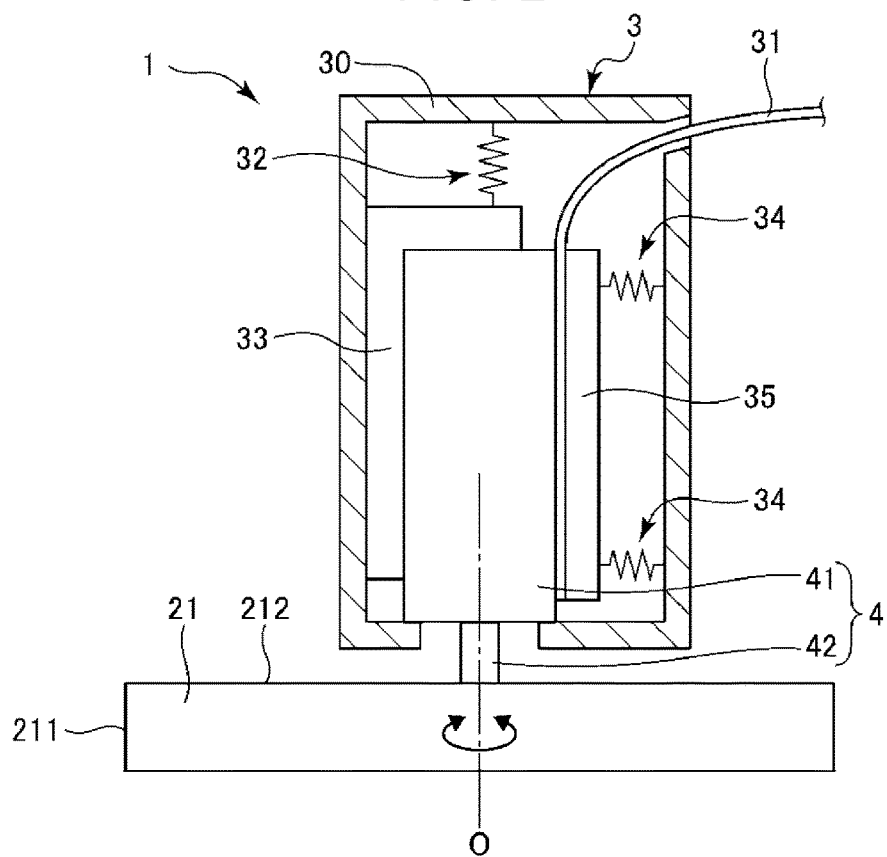
FIG. 2 is an overall view showing a modified example of a drive device.
Figure 6:
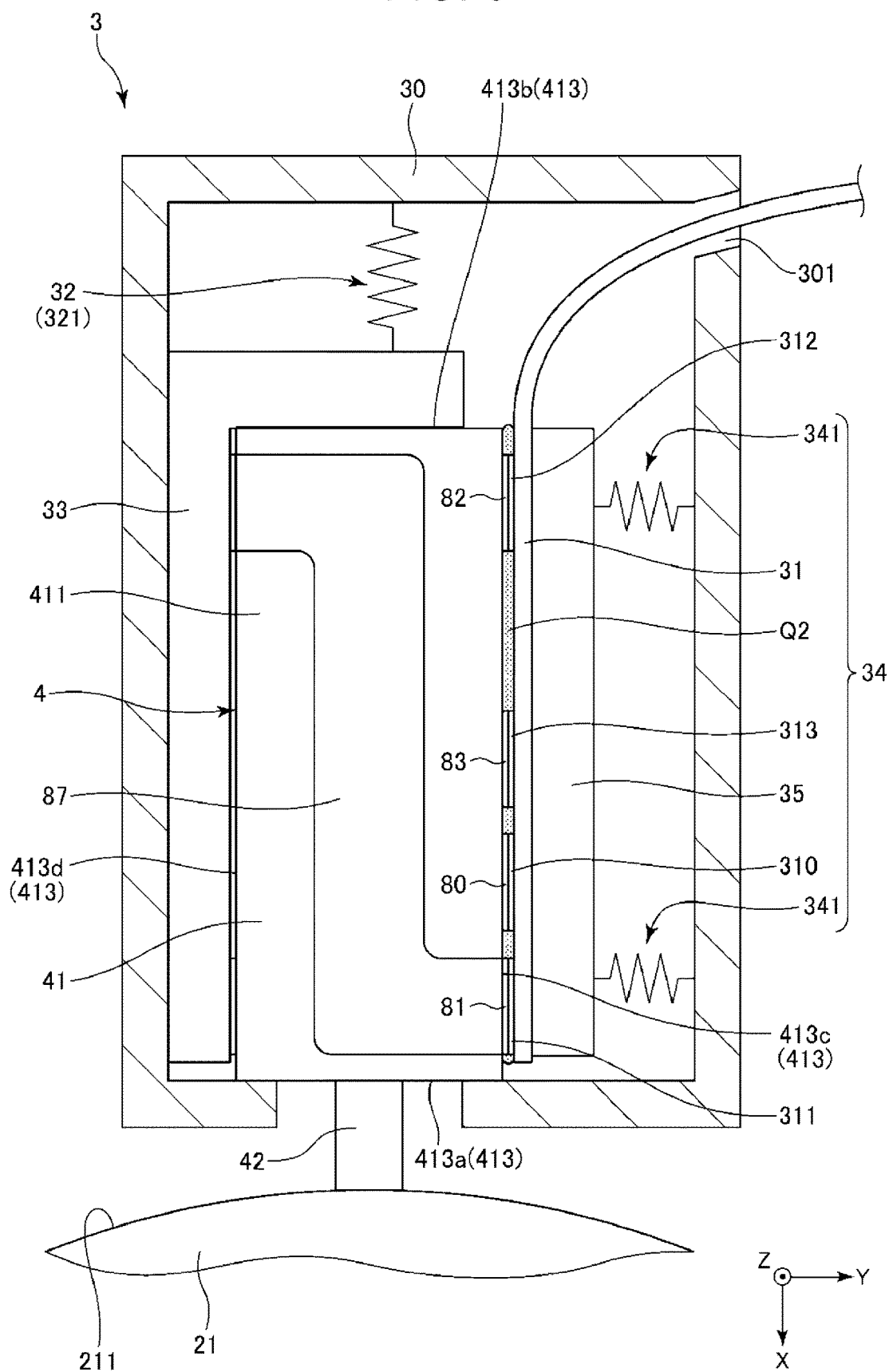
FIG. 6 is a cross-sectional view of a piezoelectric resonator.
Figure 7:
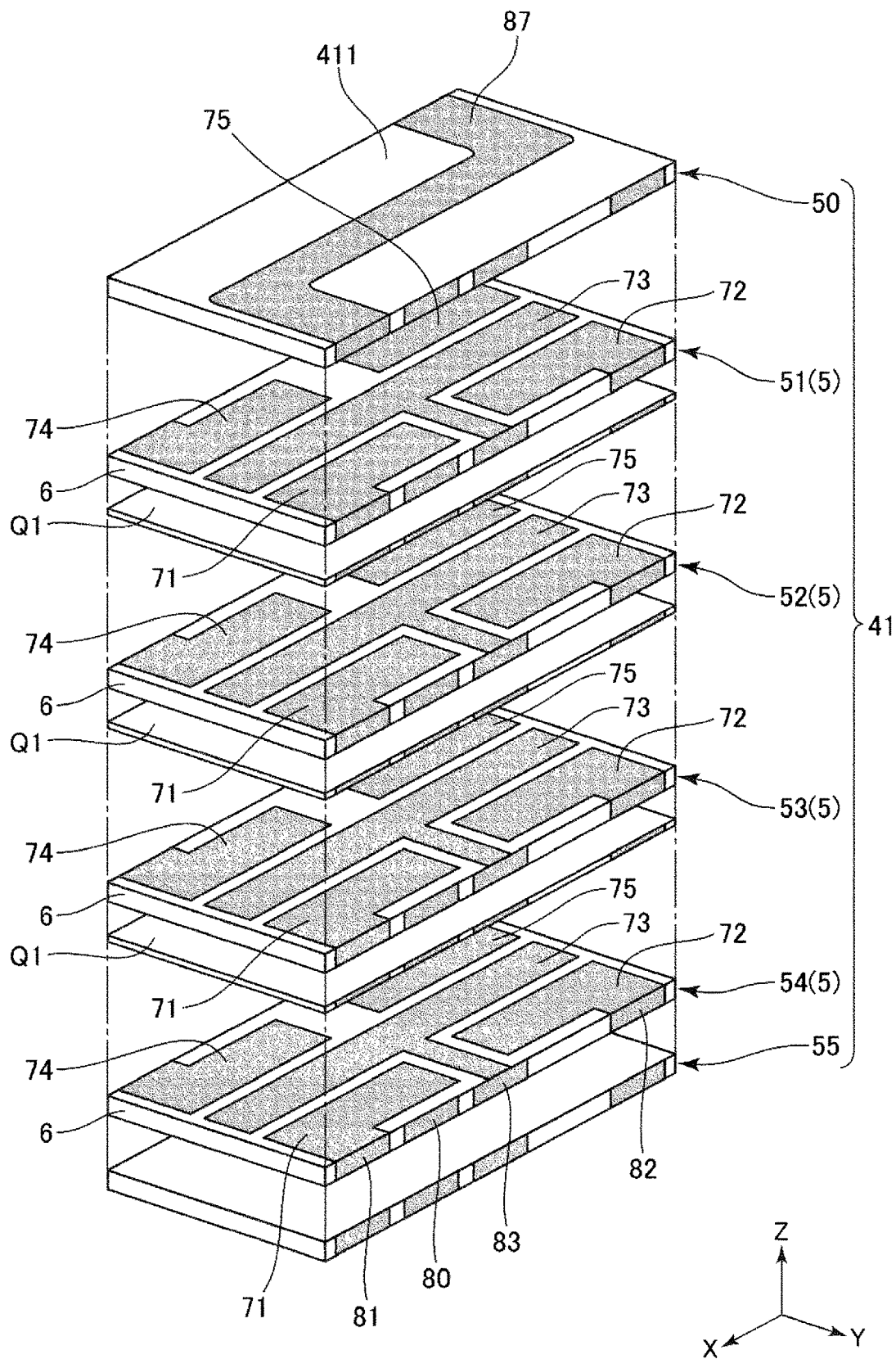
FIG. 7 is an exploded perspective view of a vibrating part.
Figure 8:
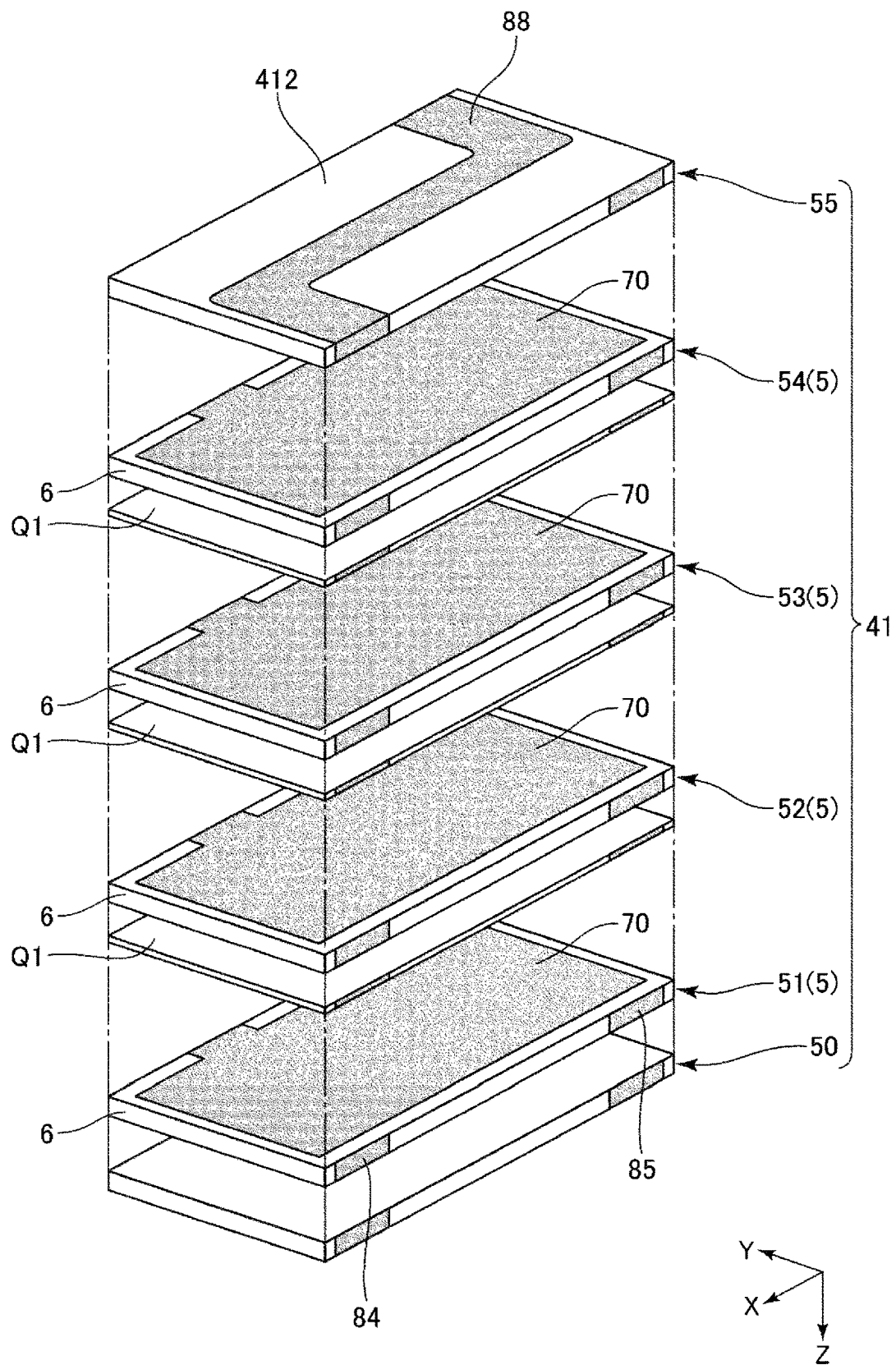
FIG. 8 is an exploded perspective view of the vibrating part.
Figure 9:
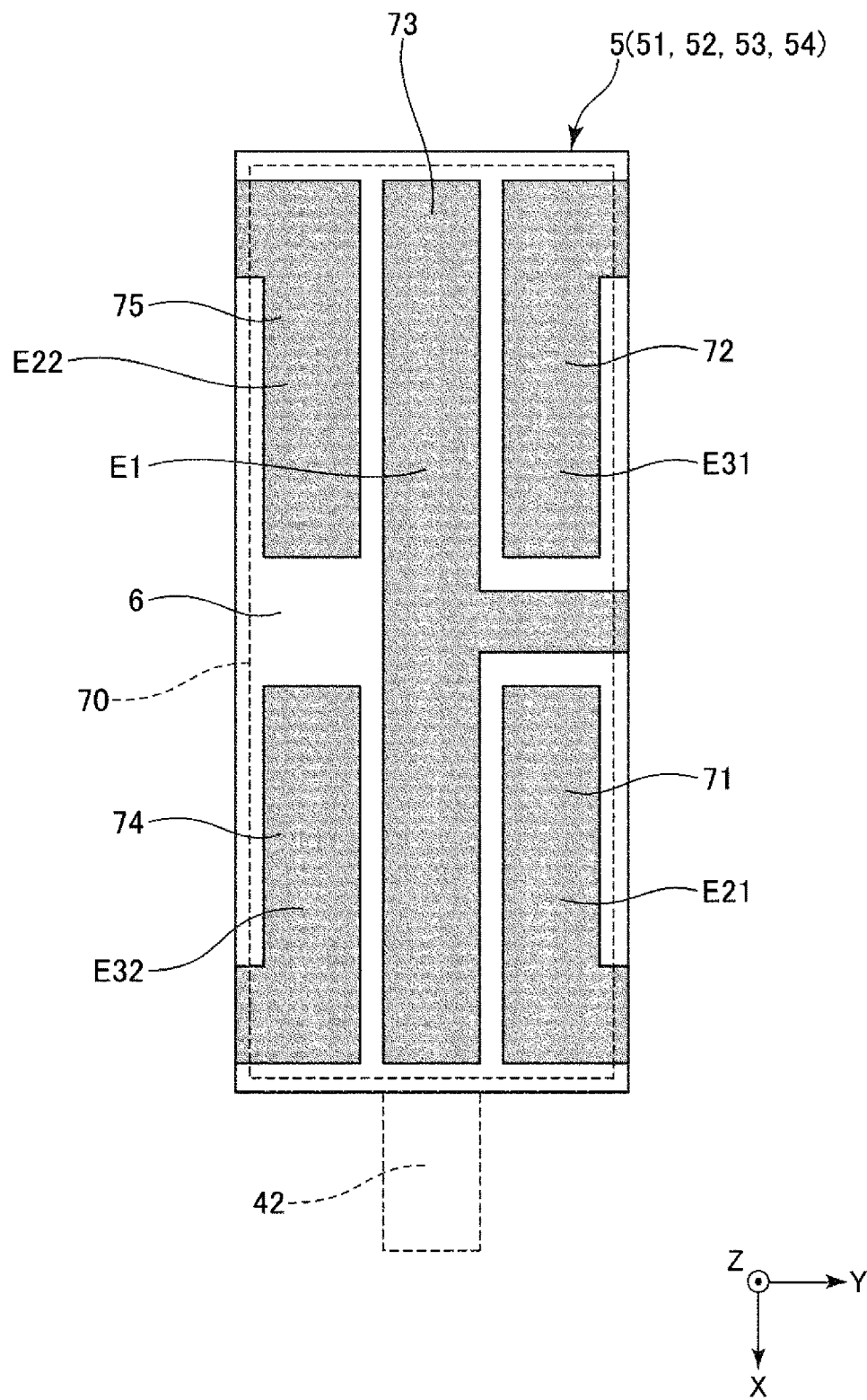
FIG. 9 is a plan view of a vibrating plate.
Figure 10:
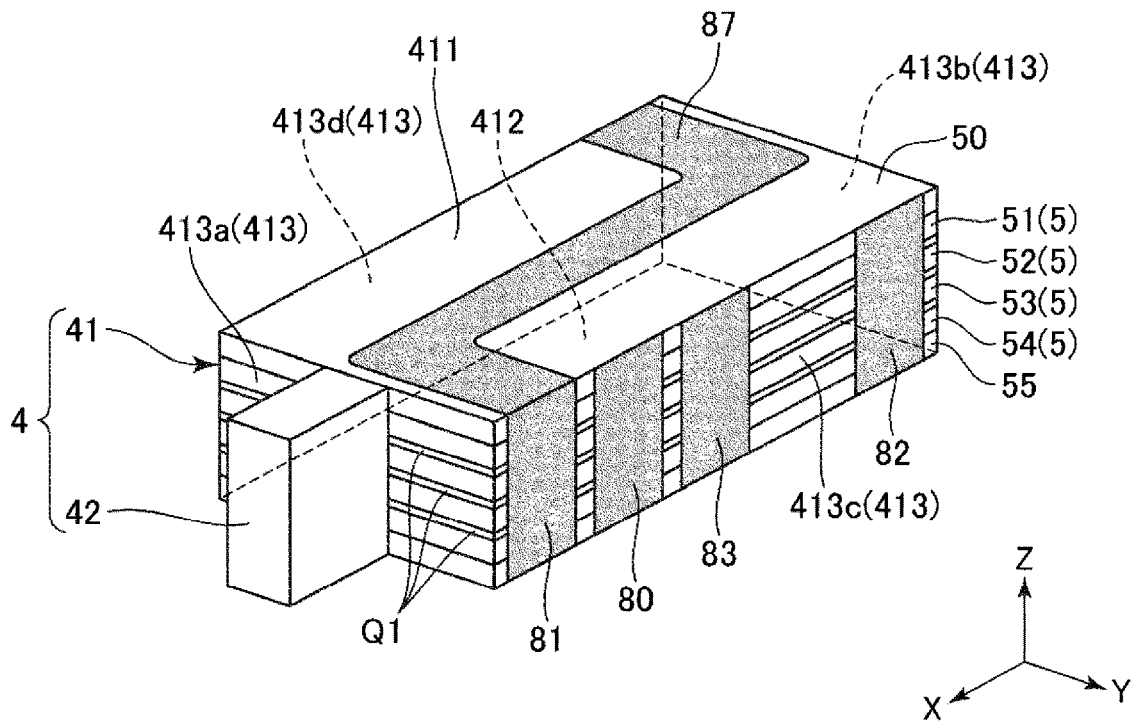
FIG. 10 is a perspective view of a vibrating body.
Figure 11:
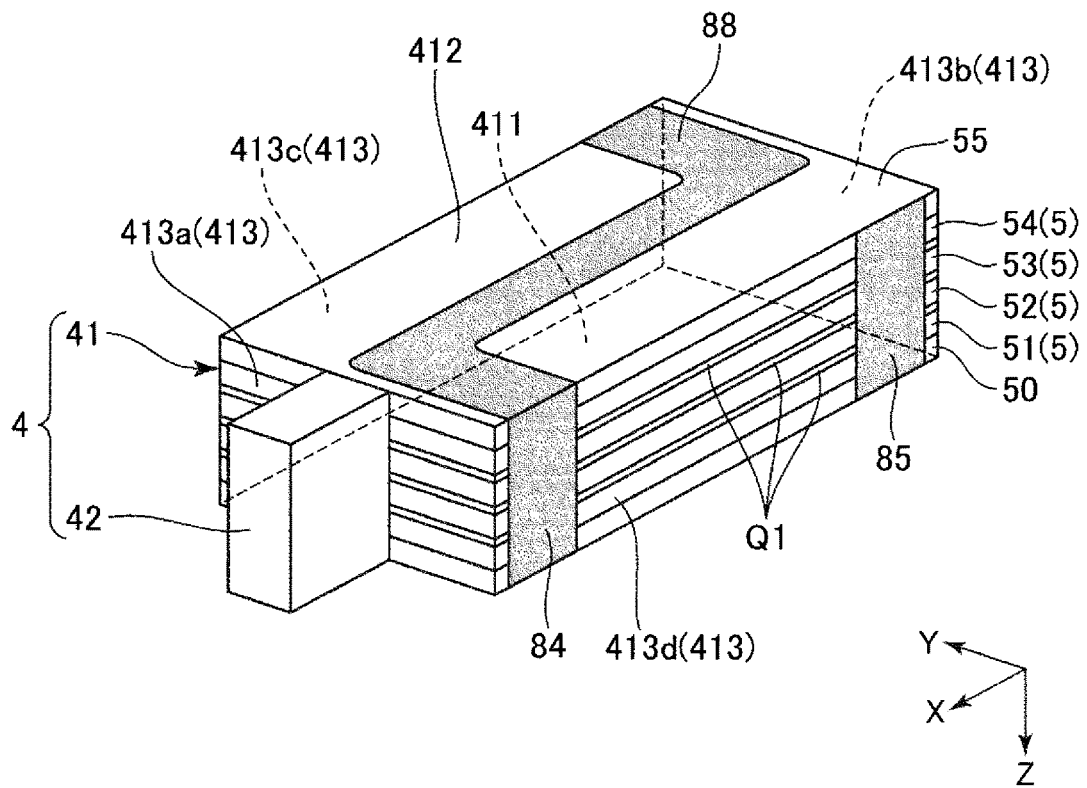
FIG. 11 is a perspective view of the vibrating body.
Figure 12:
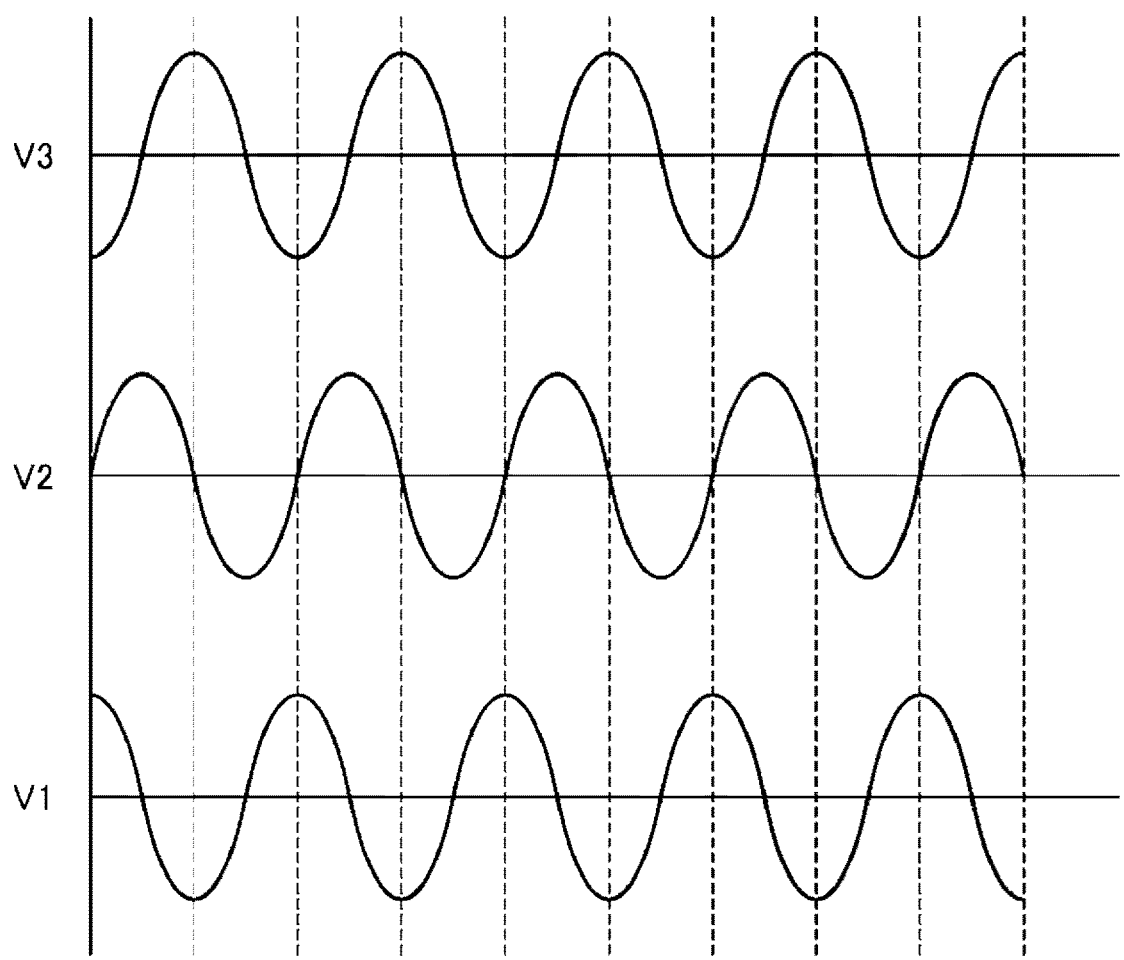
FIG. 12 is a diagram showing an alternating voltage to be applied to the vibrating body.
Figure 13:
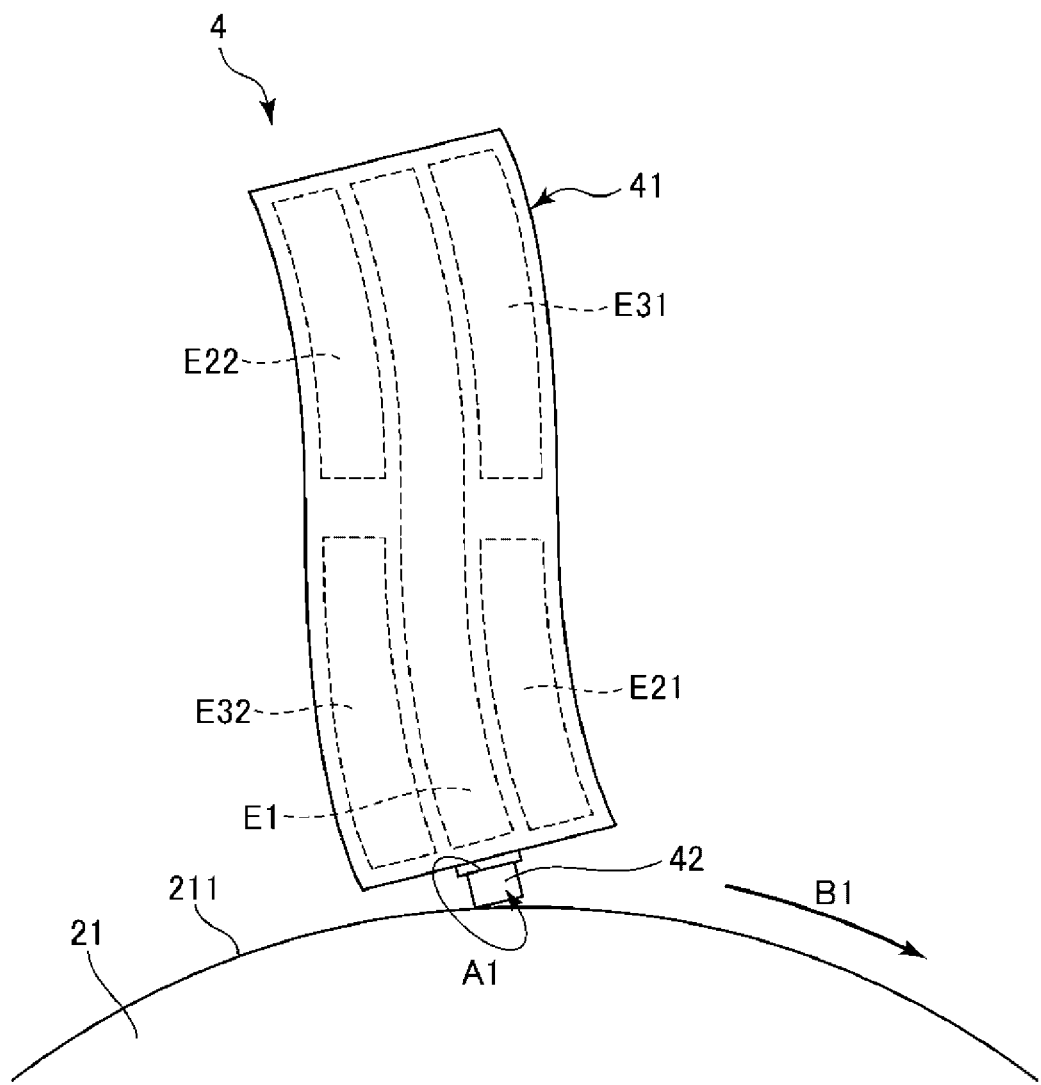
FIG. 13 is a diagram showing a driving state of the vibrating body.
Figure 13:
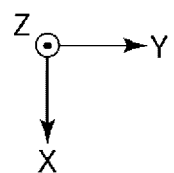
Figure 14:
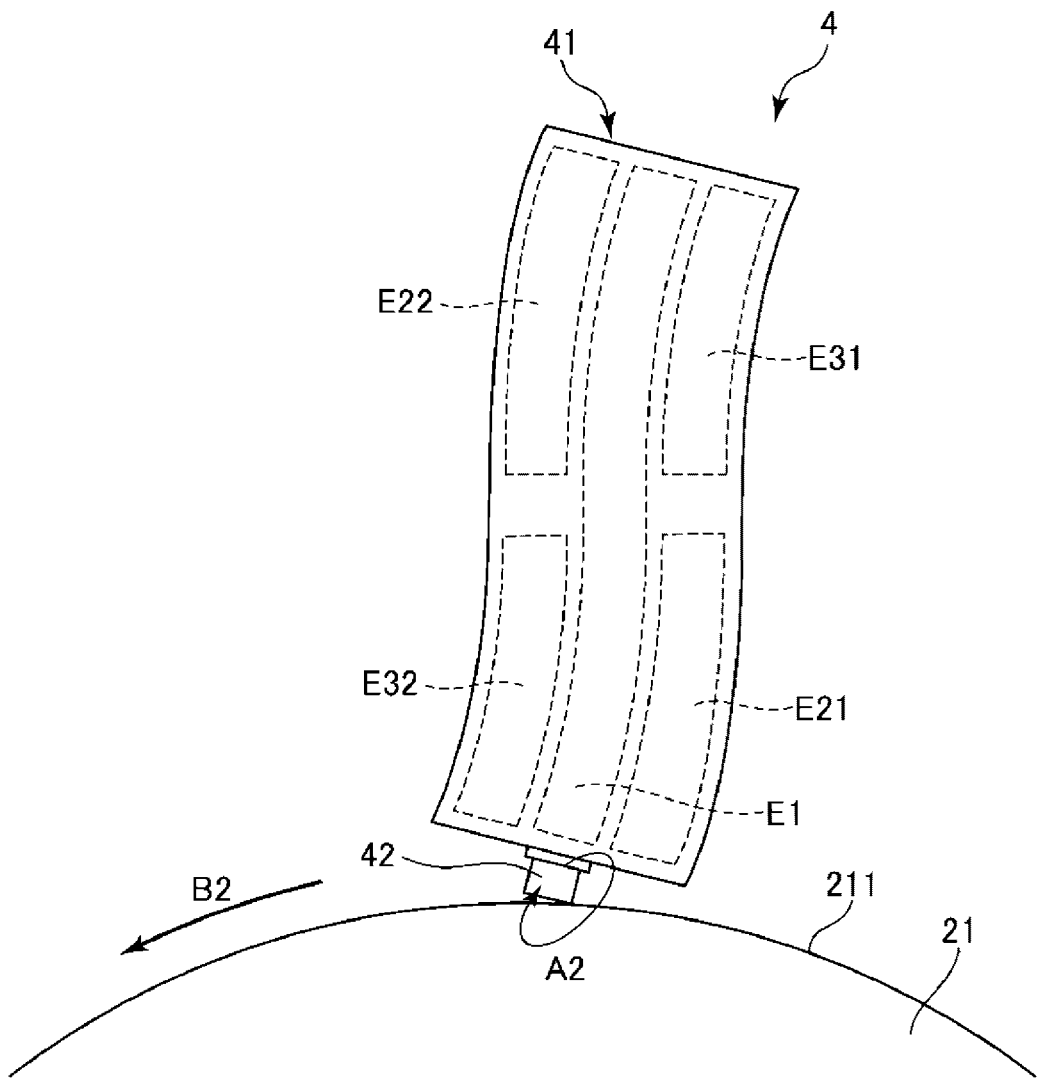
FIG. 14 is a diagram showing a driving state of the vibrating body.

FIG. 1 is an overall view showing a drive device according to a first embodiment. FIG. 2 through FIG. 5 are each an overall view showing a modified example of the drive device. FIG. 6 is a cross-sectional view of a piezoelectric resonator. FIG. 7 and FIG. 8 are each an exploded perspective view of a vibrating part. FIG. 9 is a plan view of a vibrating plate. FIG. 10 and FIG. 11 are each a perspective view of a vibrating body. FIG. 12 is a diagram showing an alternating voltage to be applied to the vibrating body. FIG. 13 and FIG. 14 are each a diagram showing a driving state of the vibrating body.

It should be noted that hereinafter, three axes perpendicular to each other are defined as an X axis, a Y axis, and a Z axis as coordinate axes inherent in the piezoelectric resonator, and a direction along the X axis is also referred to as an X-axis direction, a direction along the Y axis is also referred to as a Y-axis direction, and a direction along the Z axis is also referred to as a Z-axis direction for the sake of convenience of explanation. Further, the arrow side of each of the axes is also referred to as a "positive side," and the opposite side to the arrow is also referred to as a "negative side."

A drive device 1 shown in FIG. 1 has a rotor 21 as a driven body rotatable around a rotational axis O along the Z axis, a piezoelectric resonator 3 for rotating the rotor 21 around the rotational axis O, and a control device 9 for controlling the drive of the piezoelectric resonator 3.

In such a drive device 1, by the piezoelectric resonator 3 being driven due to the control by the control device 9, and thus the drive force generated in the piezoelectric resonator 3 being transmitted to the rotor 21, the rotor 21 rotates around the rotational axis O. It should be noted that in FIG. 1, there is adopted a configuration in which the piezoelectric resonator 3 makes contact with an outer circumferential surface 211 of the rotor 21 to transmit the drive force to the outer circumferential surface 211, but this is not a limitation, and it is possible to adopt a configuration in which the piezoelectric resonator 3 makes contact with a principal surface 212 of the rotor 21 to transmit the drive force to the principal surface 212 as shown in, for example, FIG. 2.

Figure 3:
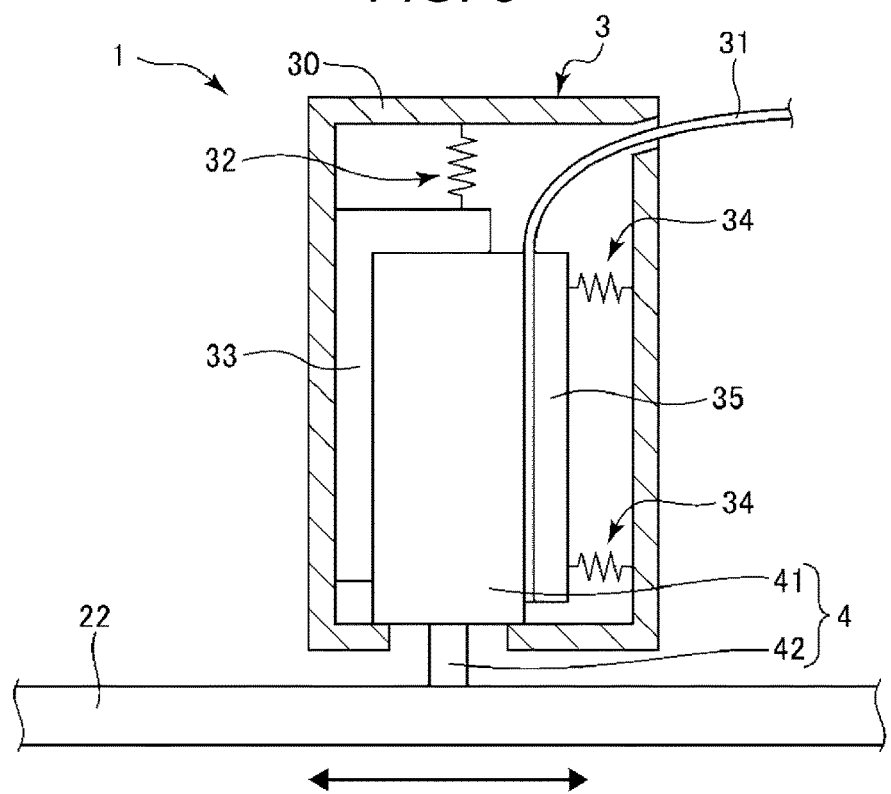
FIG. 3 is an overall view showing a modified example of a drive device.

Further, the driven part is not limited to the rotor 21, and can be a slider 22 slidable in a lateral direction in the drawing as shown in, for example, FIG. 3. In other words, the drive device 1 can be a rotary type drive device, or can also be a linear type drive device.

Figure 4:
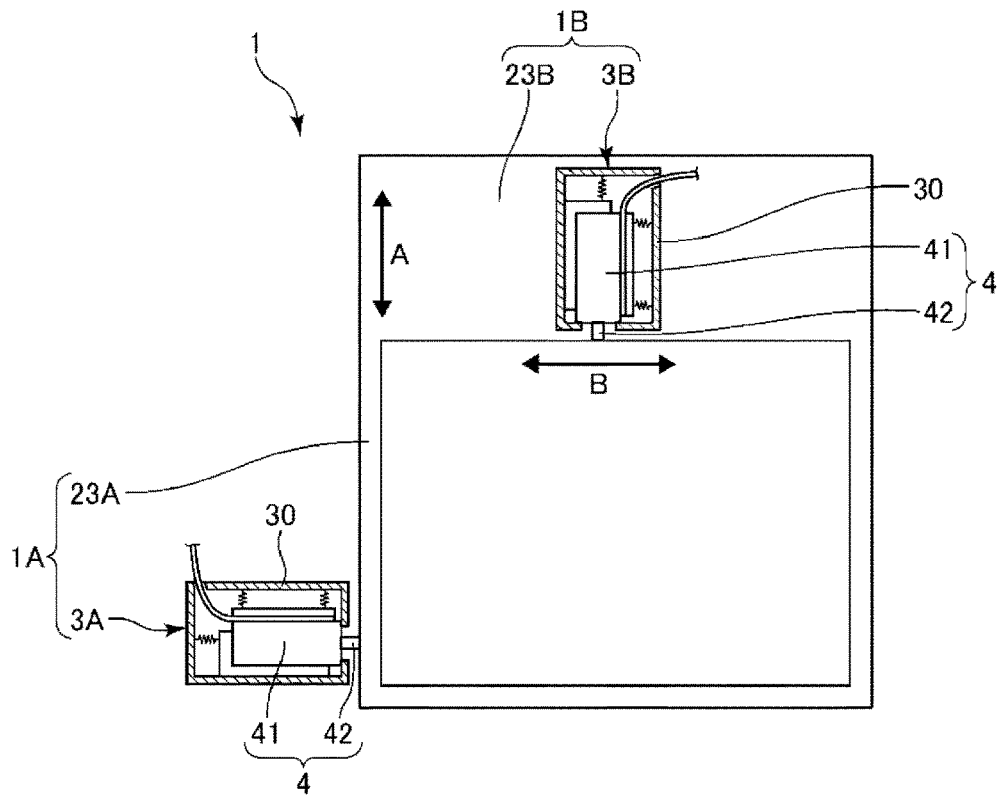
FIG. 4 is an overall view showing a modified example of a drive device.

Further, as shown in, for example, FIG. 4, the drive device 1 can be a stage with two degrees of freedom having a first drive device 1A provided with a stage 23A slidable in a direction A and a piezoelectric resonator 3A for moving the stage 23A in the direction A, and a second drive device 1B which is located on the stage 23A, and is provided with a stage 23B slidable in a direction B perpendicular to the direction A with respect to the stage 23A, and a piezoelectric resonator 3B for moving the stage 23B in the direction B.

Figure 5:
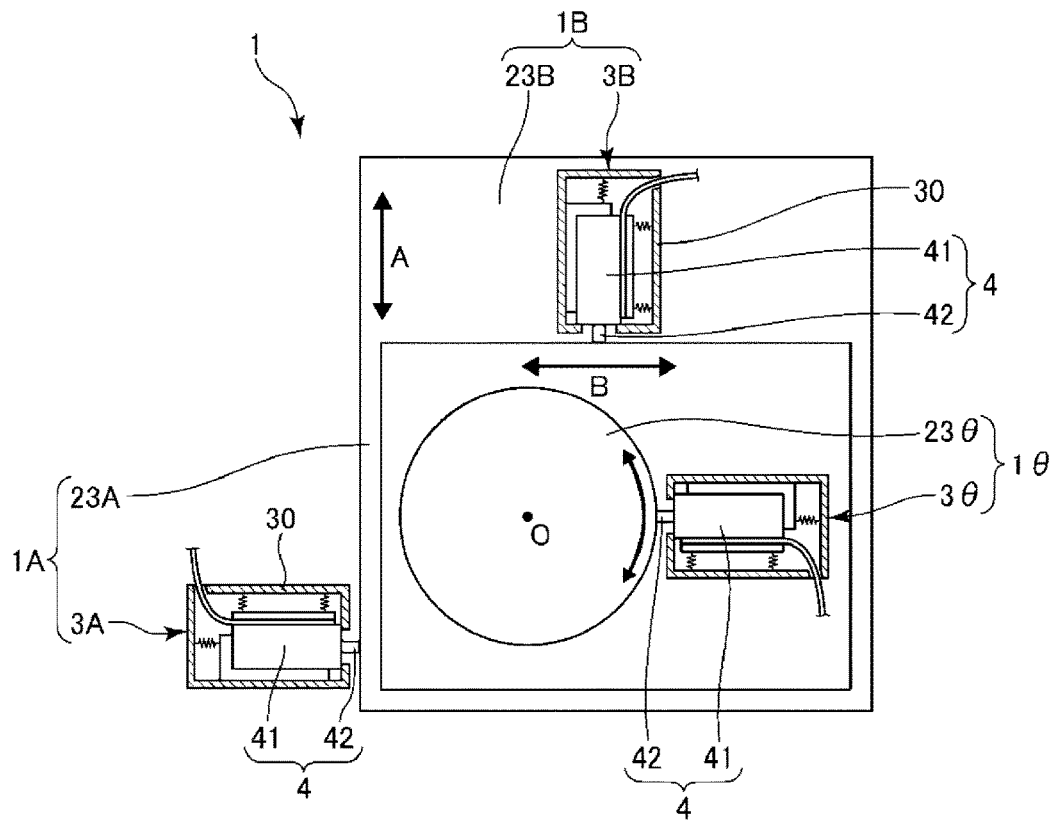
FIG. 5 is an overall view showing a modified example of a drive device.

Further, as shown in FIG. 5, the drive device 1 can be a stage with three degrees of freedom having a third drive device 1θ which is disposed on the stage 23B, and is provided with a stage 23θ rotatable around the rotational axis O with respect to the stage 23B, and a piezoelectric resonator 3θ for rotating the stage 23θ around the rotational axis O. It should be noted that the piezoelectric resonators 3A, 3B, and 3θ are substantially the same in configuration as the piezoelectric resonator 3 according to the present embodiment.

The piezoelectric resonator 3 will hereinafter be described in detail. As shown in FIG. 6, the piezoelectric resonator 3 has a case 30, a vibrating body 4 housed in the case 30, a wiring board 31 electrically coupled to the vibrating body 4, a biasing part 32 for biasing the vibrating body 4 toward the positive side in the X-axis direction, an intermediate seat 33 intervening between the vibrating body 4 and the biasing part 32, a biasing part 34 for biasing the vibrating body 4 toward the negative side in the Y-axis direction, and an intermediate seat intervening between the vibrating body 4 and the biasing part 34. It should be noted that the configuration of the piezoelectric resonator 3 is not particularly limited, and members other than the vibrating body 4 can arbitrarily be omitted or added.

The vibrating body 4 has a vibrating part 41 and a protruding part 42 which is arranged in a tip portion of the vibrating part 41, and protrudes toward the rotor 21.

As shown in FIG. 7 and FIG. 8, the vibrating part 41 is formed of a plurality of vibrating plates 5 stacked on one another in the Z-axis direction. It should be noted that in the present embodiment, there are stacked four vibrating plates 5 on one another, but the number of the vibrating plates 5 is not particularly limited as long as the number is no smaller than two. The larger the number of the vibrating plates 5 becomes, the higher drive force can be output, but the larger the thickness in the Z-axis direction becomes. Therefore, it is possible to arbitrarily select the number of the vibrating plates 5 in accordance with a maximum required output, the size, and so on.

It should be noted that hereinafter, the four vibrating plates 5 are defined as a vibrating plate 51, a vibrating plate 52, a vibrating plate 53, and a vibrating plate 54 in this order from an upper side. In the present embodiment, the vibrating plates 51, 52, 53, and 54 are substantially the same as each other, wherein one, two, or three of these are each defined as a first vibrating plate, and the rest thereof are each defined as a second vibrating plate.

As shown in FIG. 7 and FIG. 8, the vibrating plates 51, 52, 53, and 54 each have a piezoelectric layer 6, five individual electrodes 71, 72, 73, 74, and 75 arranged on an upper surface of the piezoelectric layer 6, and a single common electrode 70 arranged on a lower surface of the piezoelectric layer 6.

The constituent material of the piezoelectric layer 6 is not particularly limited, and there can be used piezoelectric ceramics such as lead zirconium titanate (PZT), barium titanate, lead titanate, potassium niobate, lithium niobate, lithium tantalate, sodium tungstate, zinc oxide, barium strontium titanate (BST), strontium bismuth tantalate (SBT), lead metaniobate, or lead scandium niobate. Further, as the piezoelectric layer, there can be used polyvinylidene fluoride, quartz crystal, and so on besides the piezoelectric ceramics described above.

As shown in FIG. 7, the individual electrode 73 is arranged along the X-axis direction in a central portion of the upper surface of the piezoelectric layer 6. Further, at the positive side in the Y-axis direction of the individual electrode 73, there are arranged the individual electrodes 71, 72 side by side along the X-axis direction, and at the negative side in the Y-axis direction, there are arranged the individual electrodes 74, 75 side by side in the X-axis direction. Further, as shown in FIG. 8, the common electrode 70 is arranged in a substantially entire area of the lower surface of the piezoelectric layer 6 in a solid manner.

In such vibrating plates 51, 52, 53, and 54, as shown in FIG. 9, in a plan view in the Z-axis direction, a region overlapping the individual electrode 73 constitutes a stretching vibrating piezoelectric element E1, a region overlapping the individual electrode 71 constitutes a flexural vibrating piezoelectric element E21, a region overlapping the individual electrode 72 constitutes a flexural vibrating piezoelectric element E31, a region overlapping the individual electrode 74 constitutes a flexural vibrating piezoelectric element E32, and a region overlapping the individual electrode 75 constitutes a flexural vibrating piezoelectric element E22.

Further, out of the four flexural vibrating piezoelectric elements E21, E22, E31, and E32, the flexural vibrating piezoelectric elements E21, E22, E31, and E32 are piezoelectric elements for flexurally deforming the vibrating plates 51, 52, 53, and 54 in the Y-axis direction. Further, as described later, by applying alternating voltages the same in frequency and different in phase respectively to the stretching vibrating piezoelectric element E1, the flexural vibrating piezoelectric elements E21, E22, and the flexural vibrating piezoelectric elements E31, E32, it is possible to make the protruding part 42 perform an elliptic oscillation.

As shown in FIG. 7 and FIG. 8, the vibrating plates 51, 52, 53, and 54 are stacked on one another in the Z-axis direction, and the vibrating plates 5 adjacent to each other are bonded to each other via a bonding material Q1 having an insulating property such as an adhesive. Thus, it is possible to insulate the common electrode 70 of the vibrating plate 5 located at the upper side and the individual electrodes 71, 72, 73, 74, and 75 of the vibrating plate 5 located at the lower side thereof from each other.

The vibrating part 41 further has an insulating layer 50 arranged on an upper surface of the vibrating plate 51, and an insulating layer 55 arranged on a lower surface of the vibrating plate 54. The insulating layers 55, 50 can each be formed of a variety of types of resin material such as polyimide.

As shown in FIG. 10 and FIG. 11, the vibrating part 41 has a substantially rectangular solid shape, and has an upper surface 411 and a lower surface 412 as a pair of principal surfaces in an obverse-reverse relationship, and side surfaces 413 which couple the upper surface 411 and the lower surface 412 to each other. Among these, the upper surface 411 is formed of an upper surface of the insulating layer 50, and the lower surface 412 is formed of a lower surface of the insulating layer 55. Further, the side surfaces 413 include a first side surface 413a located at the positive side (a tip side) in the X-axis direction of the vibrating part 41, a second side surface 413b located at the negative side (a base end side) in the X-axis direction of the vibrating part 41, a third side surface 413c located at the positive side in the Y-axis direction of the vibrating part 41, and a fourth side surface 413d located at the negative side in the Y-axis direction of the vibrating part 41.

Further, as shown in FIG. 10, four terminals 80, 81, 82, and 83 are formed on the third side surface 413c, and as shown in FIG. 11, two terminals 84, 85 are formed on the fourth side surface 413d. Further, the terminal 80 is electrically coupled to the common electrode 70 provided to each of the vibrating plates 5, the terminal 81 is electrically coupled to the individual electrode 71 provided to each of the vibrating plates 5, the terminal 82 is electrically coupled to the individual electrode 72 provided to each of the vibrating plates 5, the terminal 83 is electrically coupled to the individual electrode 73 provided to each of the vibrating plates 5, the terminal 84 is electrically coupled to the individual electrode 74 provided to each of the vibrating plates 5, and the terminal 85 is electrically coupled to the individual electrode 75 provided to each of the vibrating plates 5.

Further, the terminal 85 is electrically coupled to the terminal 81 via an electric line 87 arranged on the upper surface 411, and the terminal 84 is electrically coupled to the terminal 82 via an electric line 88 arranged on the lower surface 412. Thus, the individual electrodes 71, 75 are electrically coupled to each other, and the individual electrodes 72, 74 are electrically coupled to each other.

As shown in FIG. 6, the protruding part 42 is disposed in a tip portion of the vibrating part 41, and protrudes from the vibrating part 41 toward the positive side in the X-axis direction. Further, the tip portion of the protruding part 42 has contact with the outer circumferential surface 211 of the rotor 21. Further, the protruding part 42 is pressed against the outer circumferential surface 211 by the biasing part 32. Therefore, the vibration of the vibrating part 41 is efficiently transmitted to the rotor 21 via the protruding part 42. The protruding part 42 can be formed of a relatively hard material, for example, a variety of types of ceramics such as alumina, titania, and zirconia.

The intermediate seat 33 has a substantially L shape, and is arranged so as to be opposed to the second side surface 413b and the fourth side surface 413d of the vibrating part 41. The biasing part 32 is arranged at the negative side in the X-axis direction of the intermediate seat 33, and biases the vibrating body 4 toward the rotor 21 via the intermediate seat 33. By pressing the tip portion of the protruding part 42 against the rotor 21 with the biasing part 32, it is possible to efficiently transmit the drive force of the vibrating part 41 to the rotor 21. The biasing part 32 is not particularly limited, but there is used a helical compression spring 321 in the present embodiment. Thus, the configuration of the biasing part 32 is simplified.

The intermediate seat 35 has a straight shape, and is arranged so as to be opposed to the third side surface 413c of the vibrating part 41. The biasing part 34 is arranged at the positive side in the Y-axis direction of the intermediate seat 35, and biases the vibrating part 41 toward the negative side in the Y-axis direction via the intermediate seat 35. Thus, the vibrating part 41 is pressed against an inner surface of the case 30, and thus, the vibration of the vibrating part 41 stabilizes. The biasing part 34 is not particularly limited, but there are used a pair of helical compression springs 341 in the present embodiment. Thus, the configuration of the biasing part 34 is simplified.

The wiring board 31 is a flexible printed circuit (FPC) board shaped like a strip, and electrically couples the vibrating body 4 and the control device 9 to each other. A tip portion of the wiring board 31 is located inside the case 30, and a base end portion of the wiring board 31 projects outside the case 30 via an opening 301 provided to the case 30. Further, a tip portion of the wiring board 31 is located between the third side surface 413c of the vibrating part 41 and the intermediate seat 35, and is sandwiched therebetween. Further, the tip portion of the wiring board 31 is provided with four coupling terminals 310, 311, 312, and 313, and these coupling terminals 310, 311, 312, and 313 are each electrically coupled to the control device 9 via an electric line not shown provided to the wiring board 31.

Such a wiring board 31 is coupled to the third side surface 413c of the vibrating part 41 via a bonding material Q2 having an insulating property. Further, in a bonded state, the coupling terminal 310 is electrically coupled to the terminal 80, the coupling terminal 311 is electrically coupled to the terminal 81, the coupling terminal 3121 is electrically coupled to the terminal 82, and the coupling terminal 313 is electrically coupled to the terminal 83. Thus, the piezoelectric resonator 3 and the control device 9 are electrically coupled to each other via the wiring board 31. As described above by using the wiring board 31, the electrical coupling between the piezoelectric resonator 3 and the control device 9 becomes easy.

The control device 9 is formed of, for example, a computer, and has a processor for processing information, a memory coupled to the processor so as to be able to communicate with the processor, and an external interface. Further, the memory stores a program which can be executed by the processor, and the processor retrieves and then executes the program stored in the memory. Such a control device 9 receives a command from a host computer not shown, and then drives the piezoelectric resonator 3 based on the command.

For example, when applying the alternating voltage V1 shown in FIG. 12 to the individual electrodes 71, 75, applying the alternating voltage V2 to the individual electrode 73, and applying the alternating voltage V3 to the individual electrodes 72, 74 in the state in which the common electrode 70 is coupled to the ground, the vibrating part 41 flexurally vibrates in the Y-axis direction while making the stretching vibration in the X-axis direction, and these vibrations are combined with each other, and the tip of the protruding part 42 makes an elliptic motion of drawing an elliptic orbit counterclockwise as indicated by the arrow A1 as shown in FIG. 13. Then, the rotor 21 is fed by the elliptic motion of the protruding part 42, and thus, the rotor 21 rotates clockwise as indicated by the arrow B1. It should be noted that the stretching vibration of the vibrating part 41 toward the X-axis direction is caused mainly by a stretching motion of the stretching vibrating piezoelectric element E1, and the flexural vibration toward the Y-axis direction is caused mainly by stretching motions of the flexural vibrating piezoelectric elements E21, E22, E31, and E32.

When switching the waveforms of the alternating voltages V1, V3, the vibrating part 41 flexurally vibrates in the Y-axis direction while making the stretching vibration in the X-axis direction, and these vibrations are combined with each other to make the tip of the protruding part 42 perform an elliptic motion of drawing an elliptic orbit clockwise as indicated by the arrow A2 as shown in FIG. 14. Then, the rotor 21 is fed by the elliptic motion of the protruding part 42, and thus, the rotor 21 rotates counterclockwise as indicated by the arrow B2. It should be noted that the stretching vibration of the vibrating part 41 toward the X-axis direction is caused mainly by a stretching motion of the stretching vibrating piezoelectric element E1, and the flexural vibration toward the Y-axis direction is caused mainly by stretching motions of the flexural vibrating piezoelectric elements E21, E22, E31, and E32.

It should be noted that the "elliptic motion" has meaning including a motion the trajectory of which slightly runs off from an ellipse such as a circle or an oval besides the motion the trajectory of which coincides with an ellipse.

According to the piezoelectric resonator 3 having such a configuration, since the four vibrating plates 5 are stacked on one another, it is possible to enhance the output of the piezoelectric resonator compared to when the single vibrating plate 5 is used alone. Further, according to the piezoelectric resonator 3, since there is provided the stretching vibrating piezoelectric element E1 for making the vibrating part 41 perform the stretching vibration toward the X-axis direction, the trajectory of the elliptic motion becomes greater compared to when the stretching vibrating piezoelectric element E1 is not provided, and accordingly, the output becomes greater. Therefore, it is possible to rotate the rotor 21 with a greater deal of power. In particular, in the present embodiment, since each of the vibrating plates 5 has the stretching vibrating piezoelectric element E1, the advantages described above become more conspicuous.

The drive device 1 is hereinabove described. The piezoelectric resonator 3 included in such a drive device 1 has the vibrating part 41 having the upper surface 411 and the lower surface 412 as a pair of principal surfaces in the obverse-reverse relationship, and the side surfaces 413 coupling the upper surface 411 and the lower surface 412 to each other, and the protruding part 42 which is provided to the vibrating part 41, and transmits the drive force generated by the vibration of the vibrating part 41 to the rotor 21 as the driven part as described above. Further, the vibrating part 41 is formed of the plurality of vibrating plates 5 including the first vibrating plate and the second vibrating plate stacked on one another in the Z-axis direction as a first direction in which the upper surface 411 and the lower surface 412 are arranged side by side, the first vibrating plate (one, two, or three of the vibrating plates 51, 52, 53, and 54), in a plan view in the Z-axis direction, has the flexural vibrating piezoelectric elements E21, E22, E31, and E32 for flexurally vibrating the vibrating part 41 in the Y-axis direction as a third direction perpendicular to the X-axis direction as a second direction in which the rotor 21 and the protruding part 42 are arranged side by side, either one or both (both in the present embodiment) of the first vibrating plate and the second vibrating plate has the stretching vibrating piezoelectric element E1 for making the vibrating part 41 perform the stretching vibration in the X-axis direction as the second direction, and the plurality of terminals 80, 81, 82, and 83 electrically coupled to the flexural vibrating piezoelectric elements E21, E22, E31, and E32 and the stretching vibrating piezoelectric element E1 are arranged on the side surfaces 413. According to the piezoelectric resonator 3 having such a configuration, since there is provided the stretching vibrating piezoelectric element E1 for making the vibrating part 41 perform the stretching vibration toward the X-axis direction, the trajectory of the elliptic motion becomes greater compared to when the stretching vibrating piezoelectric element E1 is not provided, and accordingly, the output becomes greater. Therefore, it is possible to rotate the rotor 21 with a greater deal of power.

Further, as described above, the stretching vibrating piezoelectric element E1 is provided to each of the first vibrating plate and the second vibrating plate. Thus, it is possible to further increase the output of the piezoelectric resonator 3.

Further, as described above, the piezoelectric resonator 3 has the wiring board 31 electrically coupled to the plurality of terminals 80, 81, 82, and 83. Thus, the electrical coupling between the piezoelectric resonator 3 and an external device such as the control device 9 becomes easy.

Further, as described above, the piezoelectric resonator 3 has the case 30 for housing the vibrating part 41, and the biasing part 32 for biasing the vibrating part 41 toward the tip side of the protruding part 42 with respect to the case 30.

Thus, it is possible to press the protruding part 42 against the rotor 21, and it is possible to efficiently transmit the drive force of the piezoelectric resonator 3 to the rotor 21.

Further, as described above, the drive device 1 has the rotor 21 as the driven part, and the piezoelectric resonator 3 for driving the rotor 21. Further, the piezoelectric resonator 3 has the vibrating part 41 having the upper surface 411 and the lower surface 412 as a pair of principal surfaces in the obverse-reverse relationship, and the side surfaces 413 coupling the upper surface 411 and the lower surface 412 to each other, and the protruding part 42 which is provided to the vibrating part 41, and transmits the drive force generated by the vibration of the vibrating part 41 to the rotor 21 as the driven part. Further, the vibrating part 41 is formed of the plurality of vibrating plates 5 including the first vibrating plate and the second vibrating plate stacked on one another in the Z-axis direction as a first direction in which the upper surface 411 and the lower surface 412 are arranged side by side, the first vibrating plate (one, two, or three of the vibrating plates 51, 52, 53, and 54), in a plan view in the Z-axis direction, has the flexural vibrating piezoelectric elements E21, E22, E31, and E32 for flexurally vibrating the vibrating part 41 in the Y-axis direction as a third direction perpendicular to the X-axis direction as a second direction in which the rotor 21 and the protruding part 42 are arranged side by side, either one or both (both in the present embodiment) of the first vibrating plate and the second vibrating plate has the stretching vibrating piezoelectric element E1 for making the vibrating part 41 perform the stretching vibration in the X-axis direction as the second direction, and the plurality of terminals 80, 81, 82, and 83 electrically coupled to the flexural vibrating piezoelectric elements E21, E22, E31, and E32 and the stretching vibrating piezoelectric element E1 are arranged on the side surfaces 413. According to the drive device 1 having such a configuration, since there is provided the stretching vibrating piezoelectric element E1 for making the vibrating part 41 perform the stretching vibration toward the X-axis direction, the trajectory of the elliptic motion becomes greater compared to when the stretching vibrating piezoelectric element E1 is not provided, and accordingly, the output becomes greater. Therefore, it is possible to rotate the rotor 21 with a greater deal of power.

It should be noted that in the present embodiment, although each of the four vibrating plates 51, 52, 53, and 54 has the individual electrodes 71, 72, 73, 74, and 75 disposed on the upper surface thereof, and the common electrode 70 disposed on the lower surface, this is not a limitation, and for example, it is possible for one, two, or three of the four vibrating plates 51, 52, 53, and 54 to have the individual electrodes 71, 72, 73, 74, and 75 on the lower surface thereof, and have the common electrode 70 on the upper surface.

Second Embodiment

Figure 15:
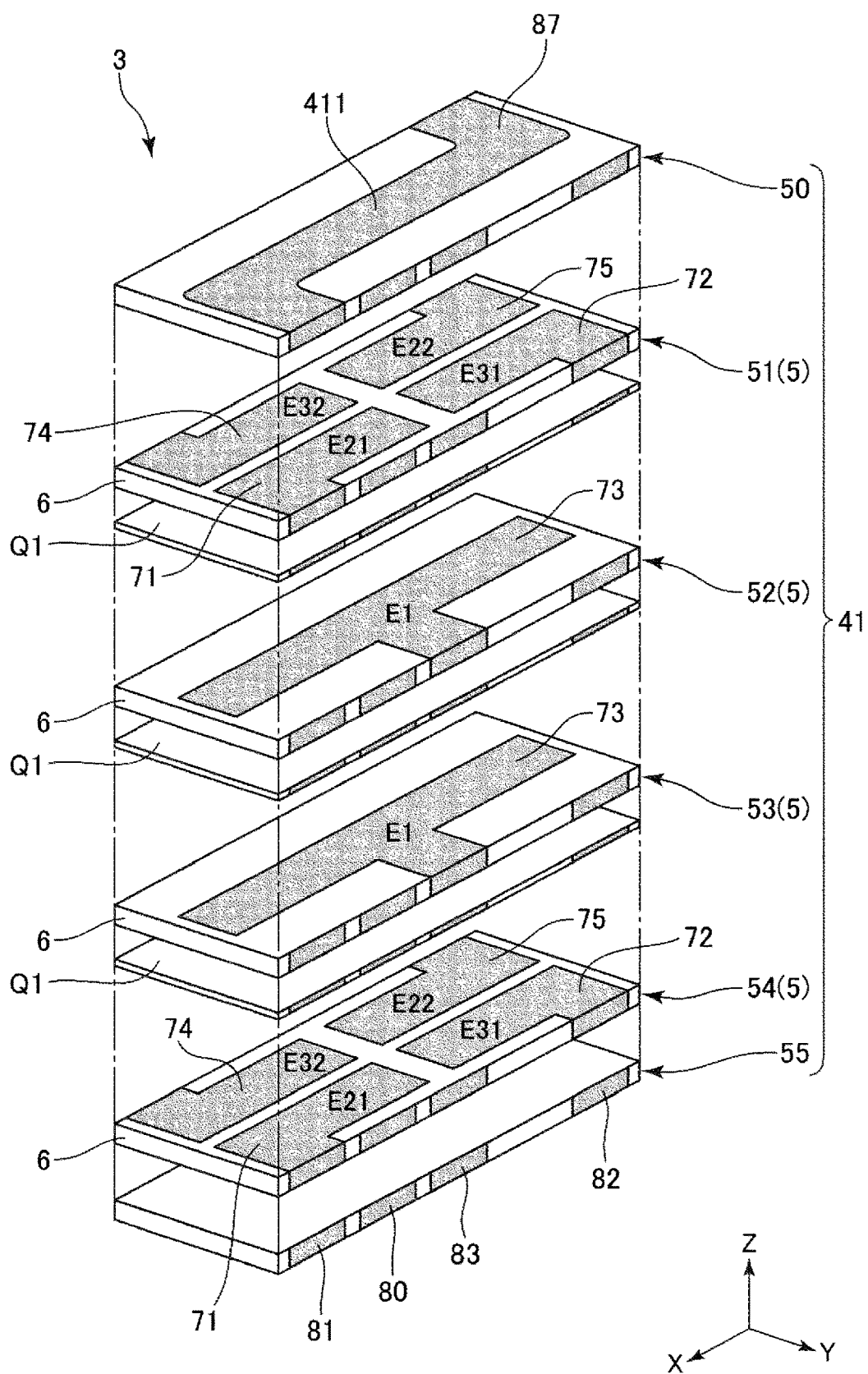
FIG. 15 is an exploded perspective view of a vibrating part provided to a piezoelectric resonator according to a second embodiment.
Figure 16:
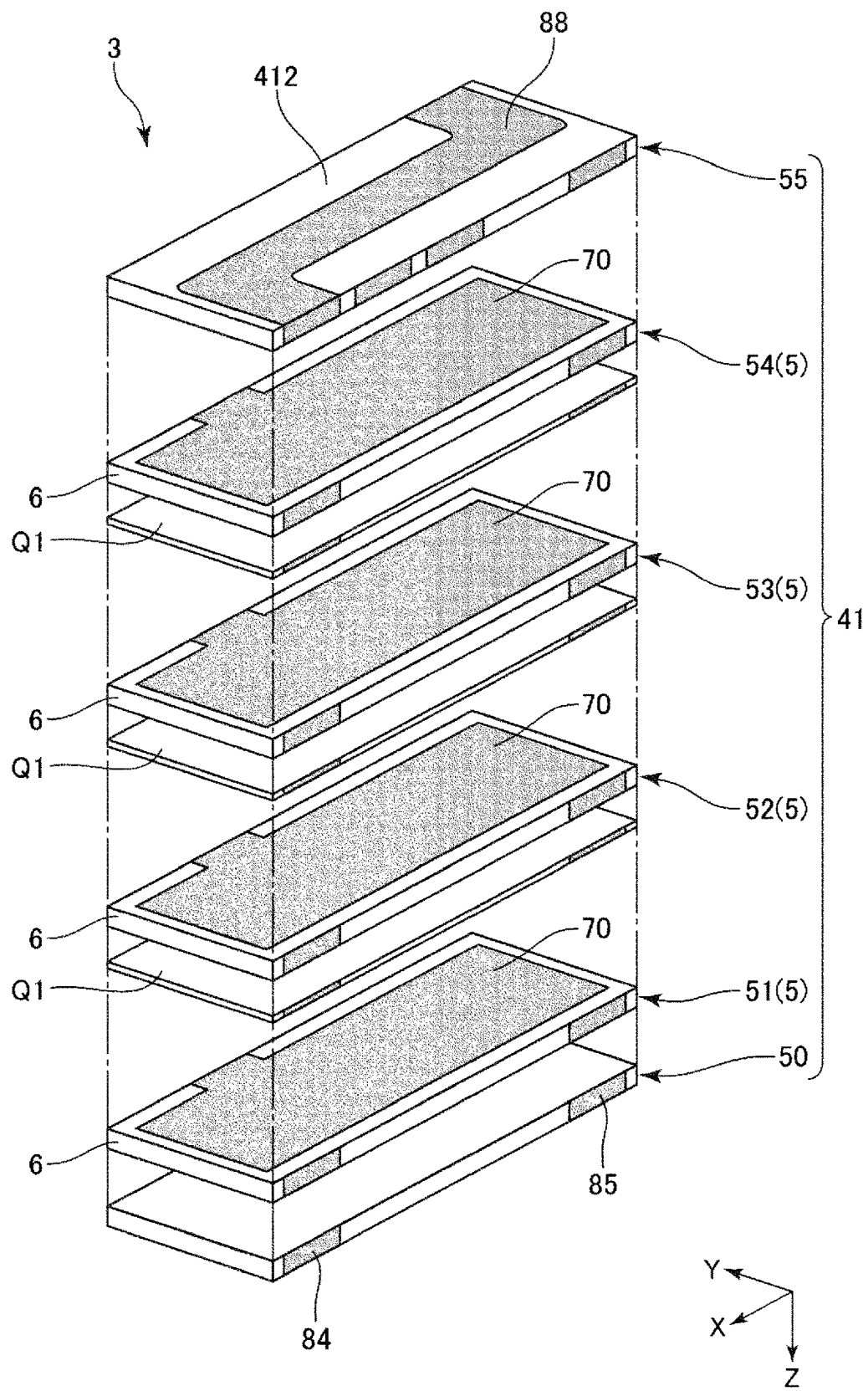
FIG. 16 is an exploded perspective view of a vibrating part provided to the piezoelectric resonator according to the second embodiment.

FIG. 15 and FIG. 16 are each an exploded perspective view of a vibrating part provided to a piezoelectric resonator according to a second embodiment.

The piezoelectric resonator 3 according to the present embodiment is substantially the same as the piezoelectric resonator 3 according to the first embodiment described above except the point that the configuration of the vibrating part 41 is different. Therefore, in the following description, the piezoelectric resonator 3 according to the present embodiment will be described with a focus on a difference from the first embodiment described above, and the description of substantially the same issues will be omitted. Further, in each of the drawings in the present embodiment, the constituents substantially the same as those in the embodiment described above are denoted by the same reference symbols.

As shown in FIG. 15 and FIG. 16, the vibrating part 41 is formed of the four vibrating plates 51, 52, 53, and 54 stacked on one another in the Z-axis direction. It should be noted that in the present embodiment, the vibrating plates 51, 54 located at both of upper and lower ends each correspond to the first vibrating plate, and the vibrating plates 52, 53 sandwiched therebetween each correspond to the second vibrating plate.

The vibrating plates 51, 54 as the first vibrating plates each have a piezoelectric layer 6, the four individual electrodes 71, 72, 74, and 75 arranged on the upper surface of the piezoelectric layer 6, and the single common electrode 70 arranged on the lower surface of the piezoelectric layer 6. In other words, the vibrating plates 51, 54 each have the flexural vibrating piezoelectric elements E21, E22, E31, and E32. In contrast, the vibrating plates 52, 53 as the second vibrating plates each have a piezoelectric layer 6, the single individual electrode 73 arranged on the upper surface of the piezoelectric layer 6, and the single common electrode 70 arranged on the lower surface of the piezoelectric layer 6. In other words, the vibrating plates 52, 53 each have the stretching vibrating piezoelectric element E1. As described above, in the present embodiment, the vibrating part 41 is flexurally vibrated by the vibrating plates 51, 54, and the vibrating part 41 is made to perform the stretching vibration by the vibrating plates 52, 53.

According to such a configuration, the number of the piezoelectric elements provided to each of the vibrating plates 51, 54 decreases from five (the stretching vibrating piezoelectric element E1, the flexural vibrating piezoelectric elements E21, E22, E31, and E32) in the first embodiment described above to four (the flexural vibrating piezoelectric elements E21, E22, E31, and E32). Therefore, in the case of, for example, the vibrating plates 51, 54 the same in size as those of the first embodiment described above, it is possible to increase the size of the flexural vibrating piezoelectric elements E21, E22, E31, and E32, and accordingly, it is possible to enhance the output of the piezoelectric resonator 3. Further, in the case of the flexural vibrating piezoelectric elements E21, E22, E31, and E32 each being the same in size as in the first embodiment, it is possible to reduce the size of the vibrating plates 5, and thus, it is possible to achieve the reduction in size of the piezoelectric resonator 3.

As described hereinabove, in the piezoelectric resonator 3 according to the present embodiment, the stretching vibrating piezoelectric element E1 is provided to each of the vibrating plates 52, 53 as the second vibrating plates. Therefore, it is possible to reduce the number of the piezoelectric elements provided to each of the vibrating plates 51, 54. Therefore, in the case of, for example, the vibrating plates 51, 54 the same in size as those of the first embodiment described above, it is possible to increase the size of the flexural vibrating piezoelectric elements E21, E22, E31, and E32, and accordingly, it is possible to enhance the output of the piezoelectric resonator 3. Further, in the case of the flexural vibrating piezoelectric elements E21, E22, E31, and E32 each being the same in size as in the first embodiment, it is possible to reduce the size of the vibrating plates 51, 54, and thus, it is possible to achieve the reduction in size of the piezoelectric resonator 3.

According also to such a second embodiment as described above, there can be exerted substantially the same advantages as in the first embodiment described above.

It should be noted that in the present embodiment, although each of the four vibrating plates 51, 52, 53, and 54 has the individual electrodes disposed on the upper surface thereof, and the common electrode 70 disposed on the lower surface, this is not a limitation, and for example, it is possible for either one or both of the vibrating plates 51, 54 to have the individual electrodes 71, 72, 74, and 75 on the lower surface thereof, and have the common electrode 70 on the upper surface. Similarly, it is possible for either one or both of the vibrating plates 52, 53 to have the individual electrode 73 on the lower surface thereof, and have the common electrode 70 on the upper surface. Further, the number of the first and second vibrating plates is not particularly limited, and it is possible that, for example, three of the vibrating plates 51, 52, 53, and 54 are each the first vibrating plate, and the remaining one thereof is the second vibrating plate, or reversely, it is possible that three of the vibrating plates 51, 52, 53, and 54 are each the second vibrating plate, and the remaining one thereof is the first vibrating plate. Further, the arrangement of the first and second vibrating plates is not particularly limited, and it is possible to, for example, sandwich the two first vibrating plates between the two second vibrating plates, or to alternately arrange the first vibrating plates and the second vibrating plates.

Third Embodiment

Figure 17:
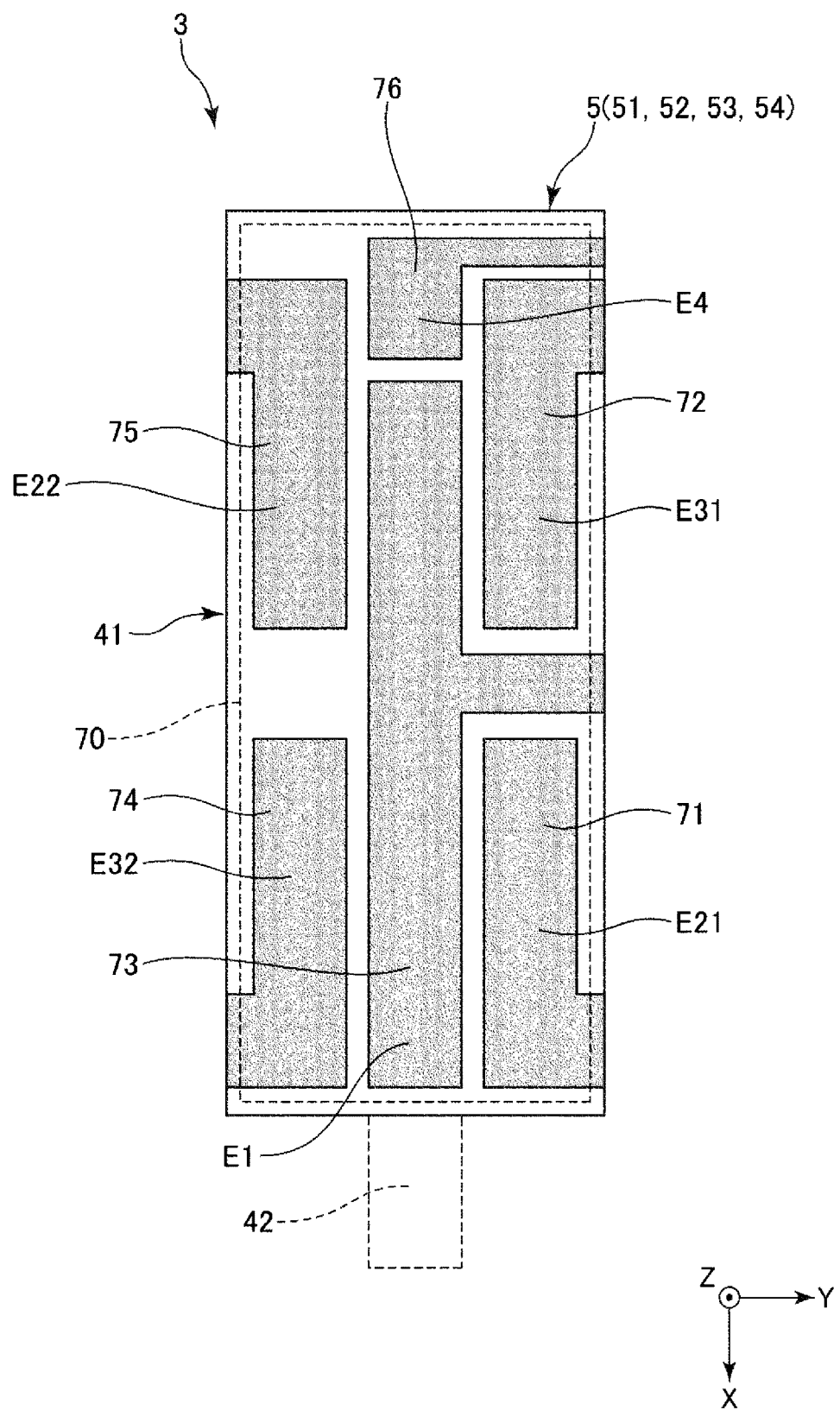
FIG. 17 is a plan view of each of vibrating plates provided to a piezoelectric resonator according to a third embodiment.
Figure 18:
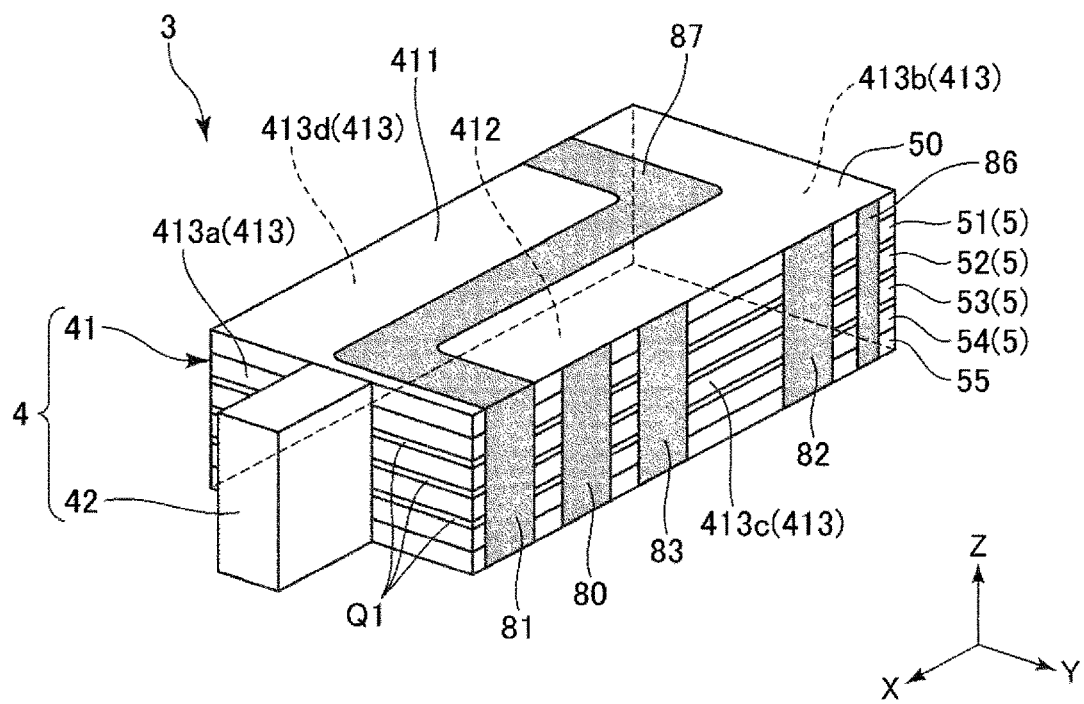
FIG. 18 is a perspective view of the vibrating body.

FIG. 17 is a plan view of each of vibrating plates provided to a piezoelectric resonator according to a third embodiment. FIG. 18 is a perspective view of a vibrating body.

The piezoelectric resonator 3 according to the present embodiment is substantially the same as the piezoelectric resonator 3 according to the first embodiment described above except the point that the configuration of the vibrating part 41 is different. Therefore, in the following description, the piezoelectric resonator 3 according to the present embodiment will be described with a focus on a difference from the first embodiment described above, and the description of substantially the same issues will be omitted. Further, in each of the drawings in the present embodiment, the constituents substantially the same as those in the embodiment described above are denoted by the same reference symbols.

As shown in FIG. 17, each of the vibrating plates 51, 52, 53, and 54 is further provided with a detection electrode 76 on the upper surface thereof in addition to the individual electrodes 71, 72, 73, 74, and 75. The detection electrode 76 is arranged side by side in the X-axis direction with the individual electrode 73, and is located at the base end side (the negative side in the X-axis direction) of the individual electrode 73. In each of the vibrating plates 51, 52, 53, and 54, a region overlapping the detection electrode 76 in a plan view in the Z-axis direction constitutes a detecting piezoelectric element E4. It should be noted that the number and an arrangement of the detecting piezoelectric elements E4 are not particularly limited.

The detecting piezoelectric element E4 receives an external force in accordance with the stretching vibration toward the X-axis direction included in the elliptic motion of the vibrating part 41, and then outputs a detection signal corresponding to the external force thus received. Therefore, it is possible to detect the vibrating state of the vibrating part 41 based on the detection signal output from the detecting piezoelectric element E4.

Further, as shown in FIG. 18, on the third side surface 413c of the vibrating part 41, there is formed a terminal 86 in substantially the same manner as the terminals 80, 81, 82, and 83, and the terminal 86 is electrically coupled to the detection electrode 76 provided to each of the vibrating plates 51, 52, 53, and 54. Further, although not shown in the drawings, a coupling terminal to electrically be coupled to the terminal 86 is formed in the tip portion of the wiring board 31 in substantially the same manner as the coupling terminals 310, 311, 312, and 313.

The control device 9 controls the amplitudes of the alternating voltages V1, V2, and V3 based on the detection signal output from the detecting piezoelectric element E4. Since the amplitude of the detection signal is in a correlative relationship with a rotational speed of the rotor 21, by performing the feedback control of the amplitude of the alternating voltage V2 so that, for example, the amplitude of the detection signal keeps a predetermined value, it is possible to stably rotate the rotor 21 at a predetermined speed. It should be noted that although in the example described above, there is performed the feedback control only on the alternating voltage V2 to be applied to the stretching vibrating piezoelectric element E1, this is not a limitation, and it is also possible to further perform the feedback control also on the alternating voltages V1, V3 to be applied to the flexural vibrating piezoelectric elements E21, E22, E31, and E32.

In particular, in the present embodiment, since the detecting piezoelectric element E4 is provided to each of the vibrating plates 51, 52, 53, and 54, the detection signal becomes higher in amplitude, and the accuracy of the feedback control described above is improved. It should be noted that this is not a limitation, and it is sufficient for the detecting piezoelectric element E4 to be provided to at least one of the vibrating plates 51, 52, 53, and 54. In other words, it is possible for either one of the first vibrating plate and the second vibrating plate to be provided with the detecting piezoelectric element E4.

As described above, in the piezoelectric resonator 3 according to the present embodiment, either one or both of the first vibrating plate and the second vibrating plate have the detecting piezoelectric element E4 for detecting the vibration of the vibrating part 41. Therefore, it is possible to detect the vibrating state of the vibrating part 41 based on the detection signal output from the detecting piezoelectric element E4. Further, by performing the feedback control on the amplitude of the alternating voltage V2 to be applied to the stretching vibrating piezoelectric element E1 so that, for example, the amplitude of the detection signal keeps a predetermined value, it is possible to stably rotate the rotor 21 at a predetermined speed.

According also to such a third embodiment as described above, there can be exerted substantially the same advantages as in the first embodiment described above.

Fourth Embodiment

Figure 19:
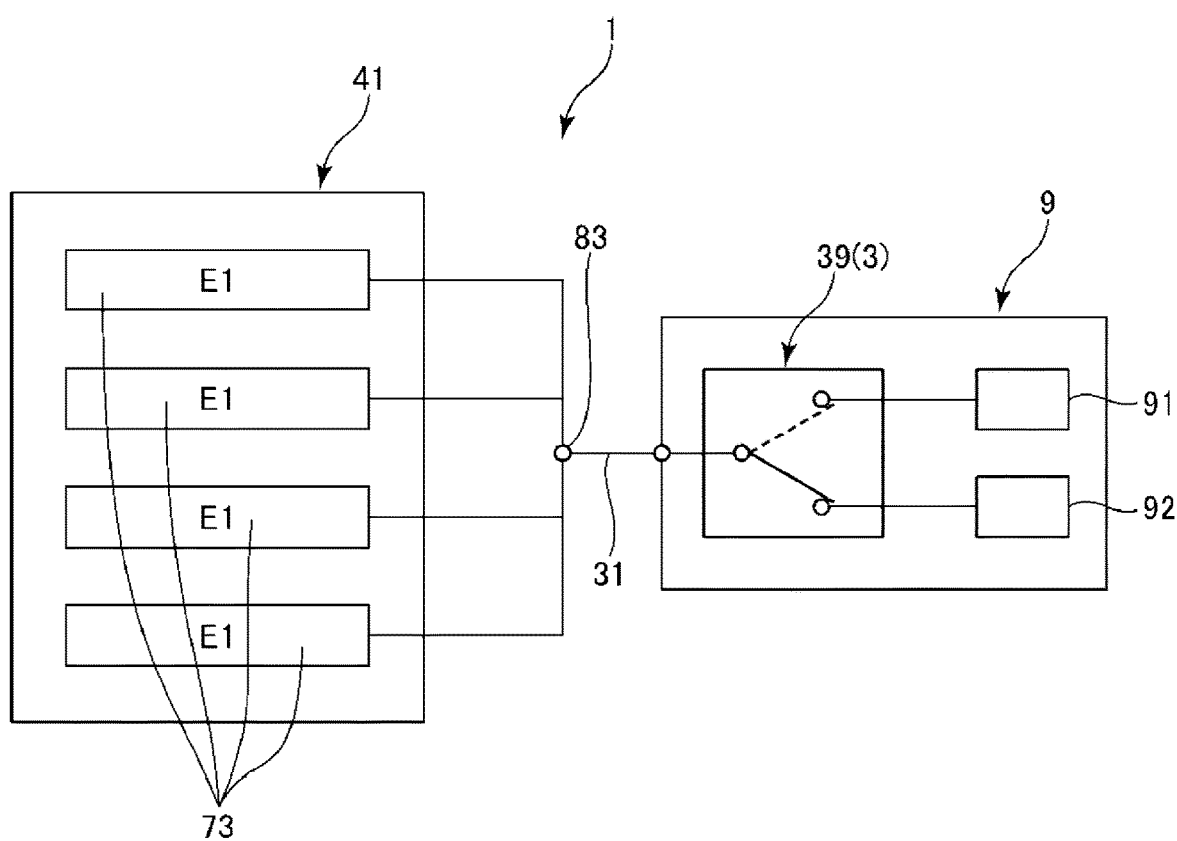
FIG. 19 is a circuit diagram of a drive device according to a fourth embodiment.

FIG. 19 is a circuit diagram of a drive device according to a fourth embodiment.

The drive device 1 according to the present embodiment is substantially the same as the drive device 1 according to the first embodiment described above except the point that the stretching vibrating piezoelectric element E1 can be switched to the detecting piezoelectric element. Therefore, in the following description, the drive device 1 according to the present embodiment will be described with a focus on a difference from the first embodiment described above, and the description of substantially the same issues will be omitted. Further, in each of the drawings in the present embodiment, the constituents substantially the same as those in the embodiment described above are denoted by the same reference symbols.

As shown in FIG. 19, the drive device 1 according to the present embodiment has a switch circuit 39. The switch circuit 39 can be switched between a drive mode of electrically coupling each of the individual electrodes 73 and a voltage applying section 91 of the control device 9 to each other, and a detection mode of electrically coupling each of the individual electrodes 73 and a detection signal reception section 92 of the control device 9 to each other. In the drive mode, the alternating voltage V2 is applied from the voltage applying section 91 to each of the individual electrodes 73, and the stretching vibrating piezoelectric elements E1 is used for driving the vibrating part 41 together with the flexural vibrating piezoelectric elements E21, E22, E31, and E32. In contrast, in the detection mode, only the flexural vibrating piezoelectric elements E21, E22, E31, and E32 are used for driving the vibrating part 41, and the stretching vibrating piezoelectric elements E1 each output the detection signal corresponding to the amplitude of the vibrating part 41 to the detection signal reception section 92 of the control device 9. The control device 9 controls drive of the piezoelectric resonator 3, based on the detection signal thus received.

As described above, in the drive device 1 according to the present embodiment, since it is possible to switch the stretching vibrating piezoelectric element E1 to the detecting piezoelectric element, it becomes unnecessary to separately dispose the detecting piezoelectric element E4, and thus, it is possible to ensure the large area of the stretching vibrating piezoelectric element E1. Therefore, it is possible to enhance the output of the piezoelectric resonator 3 while making the detection of the vibration state of the vibrating part 41 possible.

As described hereinabove, the drive device 1 according to the present embodiment is provided with the switching circuit 39 for switching the stretching vibrating piezoelectric element E1 to the detecting piezoelectric element E4 for detecting the vibration of the vibrating part 41. It is possible to enhance the output of the piezoelectric resonator 3 while making the detection of the vibration state of the vibrating part 41 possible.

According also to such a fourth embodiment as described above, there can be exerted substantially the same advantages as in the first embodiment described above.

Although the piezoelectric resonator and the drive device according to the present disclosure are described based on the embodiments shown in the drawings, the present disclosure is not limited to these embodiments, but the configuration of each of the constituents can be replaced with those having substantially the same function and an arbitrary configuration. Further, the present disclosure can also be added with any other constituents. Further, it is also possible to arbitrarily combine any of the embodiments with each other.

Further, although in the embodiments described above, the vibrating plates 5 each have the configuration in which the electrodes are formed on the upper and lower surfaces of the piezoelectric layer 6, the configuration of the vibrating plates 5 is not limited thereto. For example, the vibrating plates can be provided with a configuration in which the stretching vibrating piezoelectric element and the flexural vibrating piezoelectric element are arranged on a non-piezoelectric substrate such as a silicon substrate. Further, it is possible to adopt a configuration in which the stretching vibrating piezoelectric element and the flexural vibrating piezoelectric element are sandwiched by a pair of non-piezoelectric substrates such as silicon substrates.

What is claimed is:

1. A piezoelectric resonator comprising:
a vibrating part having a pair of principal surfaces in an obverse-reverse relationship, and a side surface configured to couple the pair of principal surfaces to each other; and
a protruding part which is provided to the vibrating part, and is configured to transmit a drive force generated by a vibration of the vibrating part to a driven part, wherein
the vibrating part has a pair of vibrating plates including a first vibrating plate and a second vibrating plate stacked on one another in a first direction in which the pair of principal surfaces are arranged side by side,
the first vibrating plate has a flexural vibrating piezoelectric element configured to flexurally vibrate the vibrating part in a third direction perpendicular to a second direction in which the driven part and the protruding part are arranged side by side in a plan view of the principal surfaces,
either one or both of the first vibrating plate and the second vibrating plate have a stretching vibrating piezoelectric element configured to make the vibrating part perform a stretching vibration in the second direction, and
the side surface is provided with a plurality of terminals electrically coupled to the flexural vibrating piezoelectric element and the stretching vibrating piezoelectric element.

2. The piezoelectric resonator according to claim 1, wherein
the stretching vibrating piezoelectric element is provided to each of the first vibrating plate and the second vibrating plate.

3. The piezoelectric resonator according to claim 1, wherein
the stretching vibrating piezoelectric element is provided to the second vibrating plate.

4. The piezoelectric resonator according to claim 1, wherein
either one or both of the first vibrating plate and the second vibrating plate have a detecting piezoelectric element configured to detect a vibration of the vibrating part.

5. The piezoelectric resonator according to claim 1, further comprising:
a wiring board electrically coupled to the plurality of terminals.

6. The piezoelectric resonator according to claim 1, further comprising:
a case configured to house the vibrating part; and
a biasing part configured to bias the vibrating part toward a tip of the protruding part with respect to the case.

7. A drive device comprising:
a driven part; and
a piezoelectric resonator configured to drive the driven part, wherein
the piezoelectric resonator includes a vibrating part having a pair of principal surfaces in an obverse-reverse relationship, and a side surface configured to couple the pair of principal surfaces to each other, and a protruding part which is provided to the vibrating part, and is configured to transmit a drive force generated by a vibration of the vibrating part to a driven part, the vibrating part has a pair of vibrating plates including a first vibrating plate and a second vibrating plate stacked on one another in a first direction in which the pair of principal surfaces are arranged side by side, the first vibrating plate has a flexural vibrating piezoelectric element configured to flexurally vibrate the vibrating part in a third direction perpendicular to a second direction in which the driven part and the protruding part are arranged side by side in a plan view of the principal surfaces, either one or both of the first vibrating plate and the second vibrating plate have a stretching vibrating piezoelectric element configured to make the vibrating part perform a stretching vibration in the second direction, and the side surface is provided with a plurality of terminals electrically coupled to the flexural vibrating piezoelectric element and the stretching vibrating piezoelectric element.

8. The drive device according to claim 7, further comprising:

a switch circuit configured to switch the stretching vibrating piezoelectric element to a detecting piezoelectric element configured to detect a vibration of the vibrating part.

* * * * *